United States Patent
Kim et al.

(10) Patent No.: US 7,590,877 B2
(45) Date of Patent: Sep. 15, 2009

(54) COMPUTER SYSTEM HAVING MULTI-OPERATION SYSTEM AND METHOD FOR CHANGING OPERATING SYSTEM IN COMPUTER SYSTEM

(75) Inventors: Seock Ho Kim, Suwon-si (KR); Joo Cheol Lee, Suwon-si (KR)

(73) Assignee: LG Electronics Inc., Seoul (KR)

( * ) Notice: Subject to any disclaimer, the term of this patent is extended or adjusted under 35 U.S.C. 154(b) by 581 days.

(21) Appl. No.: 11/022,976

(22) Filed: Dec. 28, 2004

(65) Prior Publication Data

US 2005/0216722 A1    Sep. 29, 2005

(30) Foreign Application Priority Data

Mar. 25, 2004  (KR) .............. 10-2004-0020230

(51) Int. Cl.
*G06F 9/24* (2006.01)
*G06F 9/46* (2006.01)
*G06F 13/24* (2006.01)

(52) U.S. Cl. .............. 713/323; 713/1; 713/2; 713/100; 710/260; 710/261; 718/107

(58) Field of Classification Search ........ 713/1, 713/2, 100, 323; 710/260, 261; 718/107
See application file for complete search history.

(56) References Cited

U.S. PATENT DOCUMENTS 5,134,580 A * 7/1992 Bertram et al. ............ 713/1
6,892,261 B2 * 5/2005 Ohno et al. .............. 710/260
7,228,408 B2 * 6/2007 Wu et al. .................. 713/1
2001/0018717 A1  8/2001 Shimotono ............... 709/319
2005/0081212 A1 * 4/2005 Goud et al. .............. 718/107

FOREIGN PATENT DOCUMENTS

| CN | 1480836 | 3/2004 |
| KR | 20-0222673 | 2/2001 |
| KR | 2002048172 A | 6/2002 |

OTHER PUBLICATIONS

Chinese Office Action dated Sep. 22, 2006.
Korean Office Action dated Sep. 26, 2006.

* cited by examiner

*Primary Examiner*—Thomas Lee
*Assistant Examiner*—Michael J Brown
(74) *Attorney, Agent, or Firm*—KED & Associates, LLP

(57) ABSTRACT

Embodiments of a computer system and methods for changing operating systems (OSs) can perform a task switching into a different OS without checking a system reset or power off of the system. A method for changing the OS in a multi-OS system can include initializing, at the BIOS, a hardware and dividing an area on the main memory for a booting initiated by an instant-on key/signal; turning over a system control to the embedded OS after loading an embedded OS on a specific area of the divided main memory and booting the same, and operating an instant-on player (IOP). When the IOP is terminated by a user, forcibly loading the normal OS on the main memory. The normal OS can be loaded in a hidden state before termination of the IOP. Thus, a time to reach normal computer system operations from an instant-on-function can be reduced.

29 Claims, 8 Drawing Sheets

US 7,590,877 B2

COMPUTER SYSTEM HAVING MULTI-OPERATION SYSTEM AND METHOD FOR CHANGING OPERATING SYSTEM IN COMPUTER SYSTEM

BACKGROUND OF THE INVENTION

1. Field of the Invention

The present invention relates to a computer system, and more particularly, to a computer system having a multi-operation system.

2. Background of the Related Art

FIG. 1 is a block diagram of a general computer system. As shown in FIG. 1, the general computer system includes a CPU (central processing unit) 10; a video controller 11; a north bridge 12 for controlling a memory; a main memory 13; an I/O (input/output) controller 14; a south bridge 15 being an aggregation of registers managing input/output functions of peripheral devices; a HDD (hard disk drive) 16; a KBD (keyboard) controller 17 for recognizing a key signal provided from a key input part 19; and a BIOS ROM (basic input/output system read only memory) 18.

The computer system requires a booting time. The booting time is a time until the system reaches a user working condition after a power is supplied. Namely, if a system power is supplied, the CPU 10 performs a POST (power on self test) process using the BIOS. After that, initialization and test processes of the peripheral devices are performed, and a booting program is loaded to the main memory 13 from the HDD 16.

If the booting program is loaded to the main memory 13, the CPU 10 reads in and processes the booting program loaded to the main memory 13 to achieve a user working condition. Such a booting time tends to increase more and more as the computer system changes to the Windows OS (operating system) in its OS.

A computer system recently developed and brought to the market includes a function of performing a relatively simple operation such as playing a DVD (digital video disk) or an MP3 (MPEG audio layer-3) audio, by operating an embedded OS, even under an environment where a normal OS such as the Windows is not booted and executed. Such a function is called an IOF (instant-on-function).

Also, a hot key, i.e., an IOF key is added to the key input part 19 such as a keyboard. With the IOF key, a user can select and designate the IOF.

Therefore, a user can swiftly perform the IOF such as playing a DVD or an MP3 audio even without a normal OS by selectively inputting the IOF key with the computer system off. The operation of the IOF function will now be described with reference to FIG. 2.

FIG. 2 is a flowchart showing a prior art method for changing an OS in the computer system having a multi-OS (multiple operating systems). With the computer system off as shown FIG. 2, if a user selects and inputs the IOF key (block S10), a power source is supplied to the system. The keyboard controller 17 generates a key value that corresponds to the IOF key selected by the user and outputs the same to the BIOS ROM to read the BIOS.

In the meantime, the BIOS reads a specific program necessary for performing IOF (e.g., a Linux program) among a plurality of programs stored in advance in the HDD 16, and performs an operation of loading the specific program to the main memory 13 (block S11).

After the Linux program loaded to the main memory 13 is booted, an IOP (instant-on-player) is executed (block S12) to perform an operation of playing a DVD or an MP3 audio. If the IOF is terminated during execution of the IOP according to a request from a user (block S13), whether system off and system reset operations are requested, is checked (block S14). When the system off and system reset operations are not requested, the IOF is terminated (block S15).

On the contrary, when it is determined that the system off and system reset operations are requested as a result of checking (block S14), a series of system booting operations are preformed. In the system booting operations the computer system is reset and a normal OS stored in the HDD is read and uploaded to the main memory 13 (block S16). If the system is normally booted as described above, the normal OS is executed so that various relevant operations desired by a user may be performed (block S17). From blocks S15 and S17, the process ends.

However, as described above, the prior art computer system and method have various disadvantages. For example, according to the computer system of the prior art, there has been a problem that the system off and reset operations carried out by a user in order to use the normal operation again after the IOF is executed. Further, there has been a problem that a user should wait for a long time until a series of system booting operations in which booting is performed with a normal OS by completing system off and reset operations.

The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention is to provide a computer system having a multi-OS and method for changing an OS that substantially obviates one or more problems due to limitations or disadvantages of the related art.

Another object of the present invention is to provide a computer system having a multi-OS and methods for operating the same that is capable of changing from an embedded OS for IOF to a general purpose or normal OS.

Another object of the present invention is to provide a computer system having a multi-OS and a method for changing an OS in a multi-OS computer system, in which a normal OS is loaded together with loading of an embedded OS, and a task switching from the embedded OS to the normal OS can be performed upon stopping of an IOF.

Still another object of the present invention is to provide a computer system having a multi-OS and a method for changing an OS in which after an embedded OS is loaded, a normal OS is loaded in a hidden status and a task switching to the normal OS can be realized upon stopping of an IOF.

Still another object of the present invention is to provide a computer system having a multi-OS and a method for changing an OS in that computer system, in which after IOP is operated under an embedded OS, a normal OS is forcibly loaded and a task switching to a normal OS can be realized when an IOP is stopped or an IOF is stopped.

In order to achieve at least the above objects and advantages in a whole or in part, in accordance with one aspect of the present invention, there is provided a computer system having a multi-operating system (OS) that includes a central processing unit (CPU), an input part configured to control an instant-on function (IOF) by a user, a main memory divided into a first area configured to store an embedded OS (EOS) and a second area configured to store a normal OS (NOS), a hard disk drive (HDD) configured to store the normal OS, the embedded OS and a boot loader capable of loading the OSs to the main memory and a normal OS loader configured to control a loading of the normal OS and switch from the EOS to the NOS without turning off the CPU.

To further achieve at lease the above objects in a whole or in part, in accordance with one aspect of the present invention there is provided a method for changing an operating system (OS) in a computer system having multi-OSs, the method including supplying a power source to the computer system and loading an embedded OS stored in a hard disk on a main memory when the an instant-on-function (IOF) is enabled, booting the embedded OS loaded on the main memory and operating an instant-on player (IOP) under the embedded OS to perform the enabled IOF and automatically loading a normal OS stored in the hard disk on the main memory when the IOF is terminated.

To further achieve at least the above objects in a whole or in part, in accordance with one aspect of the present invention, there is provided a method for changing an operating system (OS) in a computer system having multi-OSs, the method including supplying a power source to the system when an instant-on-function is enabled with the computer system off, loading an embedded OS and a normal OS on different areas of the main memory, respectively, operating an instant-on player (IOP) requested by a user by booting and executing the loaded embedded OS and booting and executing the normal OS loaded on the main memory when the IOP is terminated.

To further achieve at least the above objects in a whole or in part, in accordance with one aspect of the present invention, there is provided a method for changing an operating system (OS) in a computer system having multi-OSs, the method including supplying a power source to the system when an instant-on signal is input, initializing a reduced hardware configuration and dividing an area on a main memory when a system booting is by the instant-on signal, turning over a system control to an embedded OS after loading an embedded OS on a prescribed area of the divided main memory, performing booting and operating of an instant-on player (IOP) under that embedded OS and when the IOP is subsequently terminated, performing booting of a normal OS after returning resources used by the embedded OS, reconfiguring the main memory, and loading the normal OS on the main memory.

To further achieve at least the above objects in a whole or in part, in accordance with one aspect of the present invention, there is provided a method for changing an operating system (OS) in a computer system having multi-OSs, the method including supplying a power source to the system responsive to an instant-on-function (IOF) signal, initializing a subset of computer system hardware and dividing an area on the main memory when a booting is determined to be caused by the IOF signal, loading an embedded OS on a first area of the divided main memory and performing an IOF corresponding to the IOF signal under the embedded OS, after executing, by the embedded OS, a normal OS loader and loading, by the normal OS loader, a normal OS on a second area of the main memory, turning over a system control to the embedded OS and reinitializing a video memory and performing a task switching into the normal OS when the IOF is terminated.

It is to be understood that both the foregoing general description and the following detailed description of embodiments according to the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
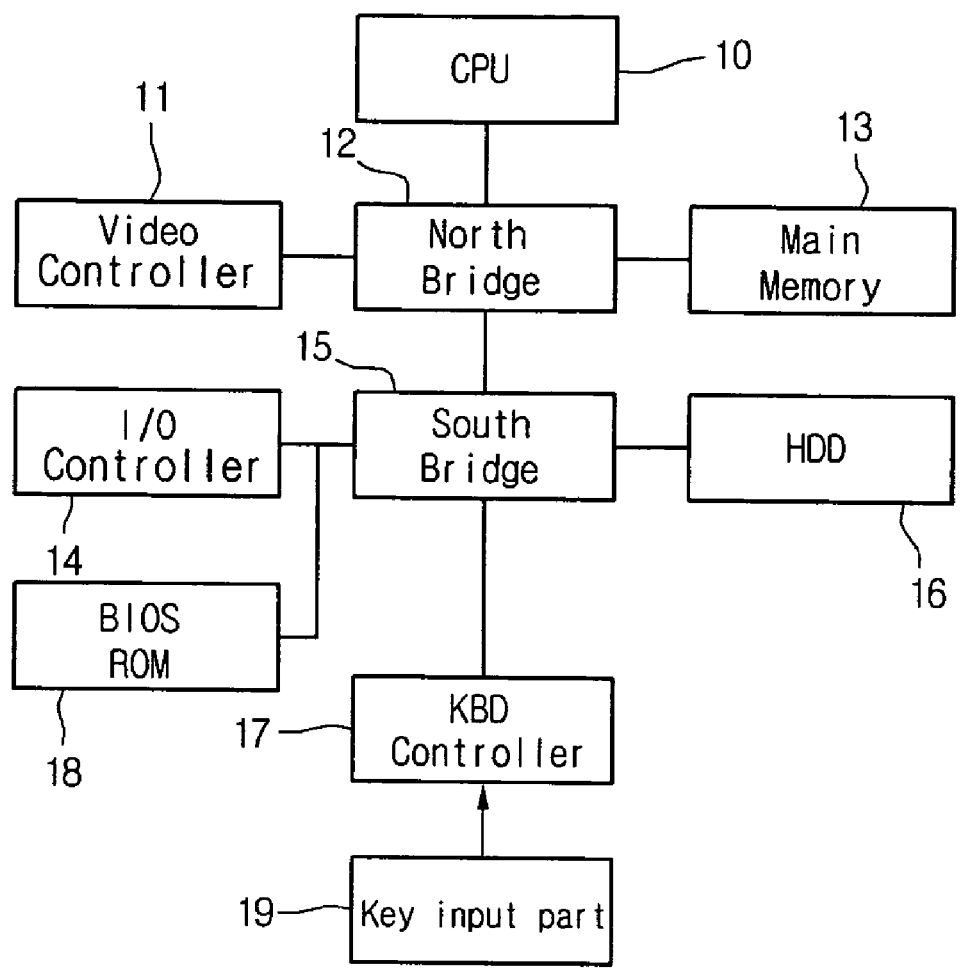
FIG. 1 is a block diagram showing a system construction of a general personal computer.
Figure 2:
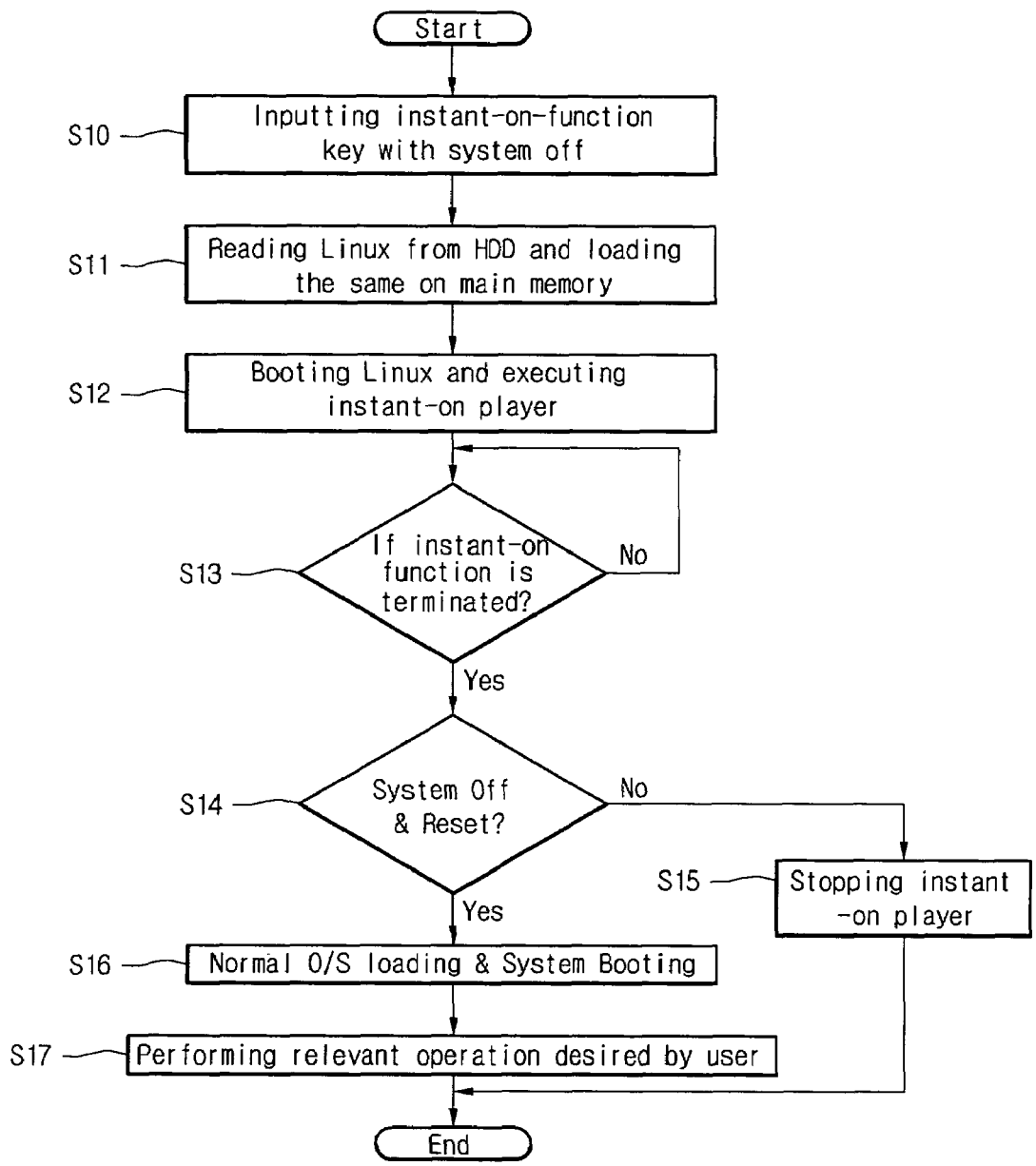
FIG. 2 is a flowchart showing a prior art method for changing an OS in a computer system having a multi-OS.
Figure 3:
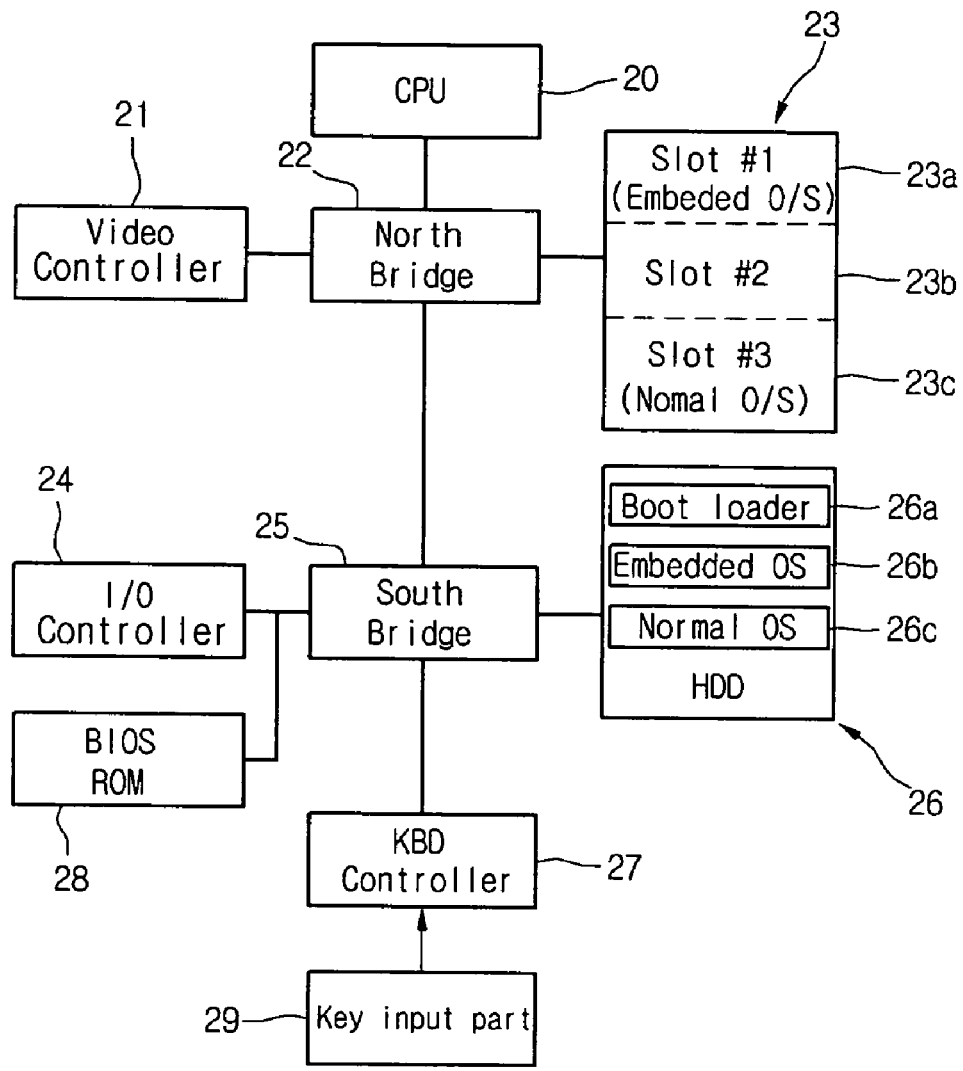
FIG. 3 is a block diagram of a computer system having a multi-OS according to a preferred embodiment of the present invention.

FIG. 3 is a block diagram of a computer system having a multi-OS according to an embodiment of the present invention. As shown in FIG. 3, the computer system can include a CPU 20; a video controller 21; a north bridge 22 for controlling a memory; a main memory 23 preferably divided into a predetermined number of areas so that multi-OSs can be loaded; an I/O controller 24; a south bridge 25 being an aggregation of registers for managing input/output functions of peripheral devices; a HDD 26 where multi-OS programs can be stored; a keyboard controller 27; a BIOS ROM 28 and a key input part 29.

The HDD 26 can store a boot loader 26a and a plurality of OS programs. The boot loader 26a can be used to load each OS, respectively. The plurality of OS programs preferably include at least an embedded OS 26b and a normal OS 26c.

The embedded OS 26b can include, for example, the Linux program and is realized for execution of the IOF. The embedded OS 26b can be stored in a hidden state.

For the normal OS 26c, the Windows program such as Windows 9x, Windows 2000, Windows XP, etc, can be used and realized for normal system operation. In one embodiment, the boot loader 26a can load the normal OS on a spare area of the main memory 23 when the system operates under the embedded OS.

The main memory 23 can load multi-OSs. The main memory 23 is preferably divided for loading multi-OSs. For example, if the system is booted with an embedded OS, the main memory 23 can be divided so that the normal OS may be loaded in a hidden state on a reserved slot.

The main memory 23, can include at least more than two or three slots (e.g., slot #1, #2, #3) 23a, 23b, 23c). For example, the embedded OS 26*b* for the IOF can be loaded on the first slot 23*a* and the normal OS can be loaded, under an instant-on state, on the third slot 23*c,* which can be a reserved slot. The main memory 23 can be a SO-DIMM (small outline dual in-line memory module).

Figure 4:
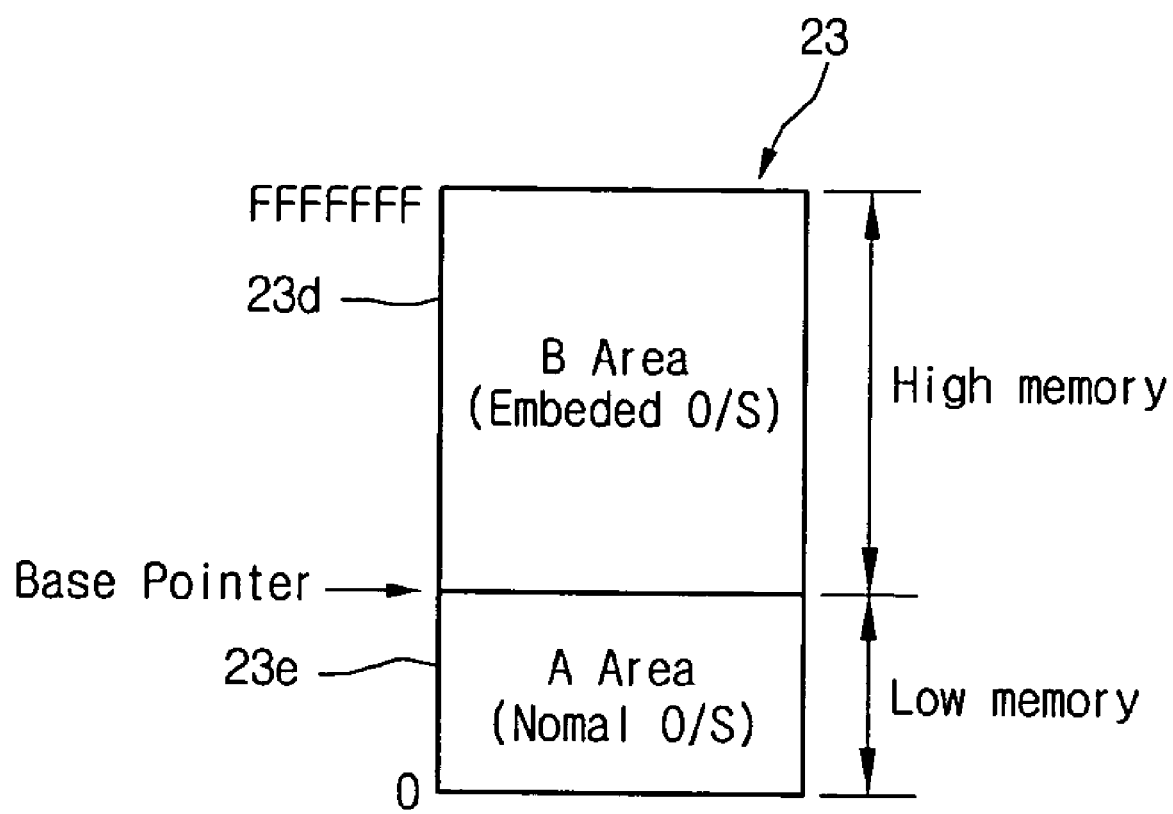
FIG. 4 is a diagram showing a construction of an exemplary memory divided into multi-OS areas according to a preferred embodiment of the present invention.

The main memory 23 may be differently or alternately configured, for example, as shown in FIG. 4. As shown in exemplary FIG. 4, the main memory 23 can be divided into at least an upper memory area (B area) and a lower memory area (A area). However, the present invention is not intended to be so limited as other configurations of the main memory can be used. As shown in FIG. 4, the embedded OS can be loaded on the upper memory area 23*d* and the normal OS can be loaded on the lower memory area 23*e* (or vice versa).

Also, the keyboard controller 27 can receive various key signals selected by a user through the key input part 29, which can have a first hot key for the instant-on key for the IOF and a second hot key for the instant-off key for termination of the IOF. Alternatively, a single hot key can be provided for the IOF hot keys, so that the IOF is toggled to the instant-off function if the hot key is selected under the instant-on state. However, the present invention is not intended to be so limited as other procedures and devices can be used to enable/disable the IOF. Further, multiple IOFs/IOPs can exist in a system.

In such a computer system, if the instant-on key is input through the key input part 29, the keyboard controller 27 can recognize an input of the IOF key and supply a power source to the system. The CPU 20 can read a program stored in the BIOS ROM 28 to perform the POST process.

The BIOS can perform a reduced or minimum hardware initialization for the IOF. For one exemplary minimum hardware, there exist a CPU, a main memory, a chipset (north bridge, south bridge, etc.), a video controller, an audio controller, and a keyboard controller 27.

In the meantime, after reading the embedded OS 26*b* necessary for performing the IOF (e.g., the Linux program), which can be stored in advance among a plurality of OSs stored in the HDD 26, the BIOS can load the same on a specific area 23*a* of the main memory 23. After the loaded embedded OS 26*b* is booted, the IOP that corresponds to the instant-on key from a user can be executed so that playing the DVD or MP3 audio is performed.

At this point, since the CPU 20 can be put in an idle state if the IOF is executed, the boot loader 26*a* can load the normal OS 26*c* on a different area (e.g., slot #3 or A area) of the main memory 23, for example, in a hidden state. In another example of the boot loader 26*a,* the boot loader 26*a* can read the normal OS 26*c* from the HDD 26 simultaneously with termination of the IOF, and store the normal OS 26*c* in a different area of the main memory 23. Accordingly, in embodiments according to the invention, a task switching to the normal OS can be performed simultaneously with termination of the IOF, whereby swift switching between the multi-OSs can be achieved.

Figure 5:
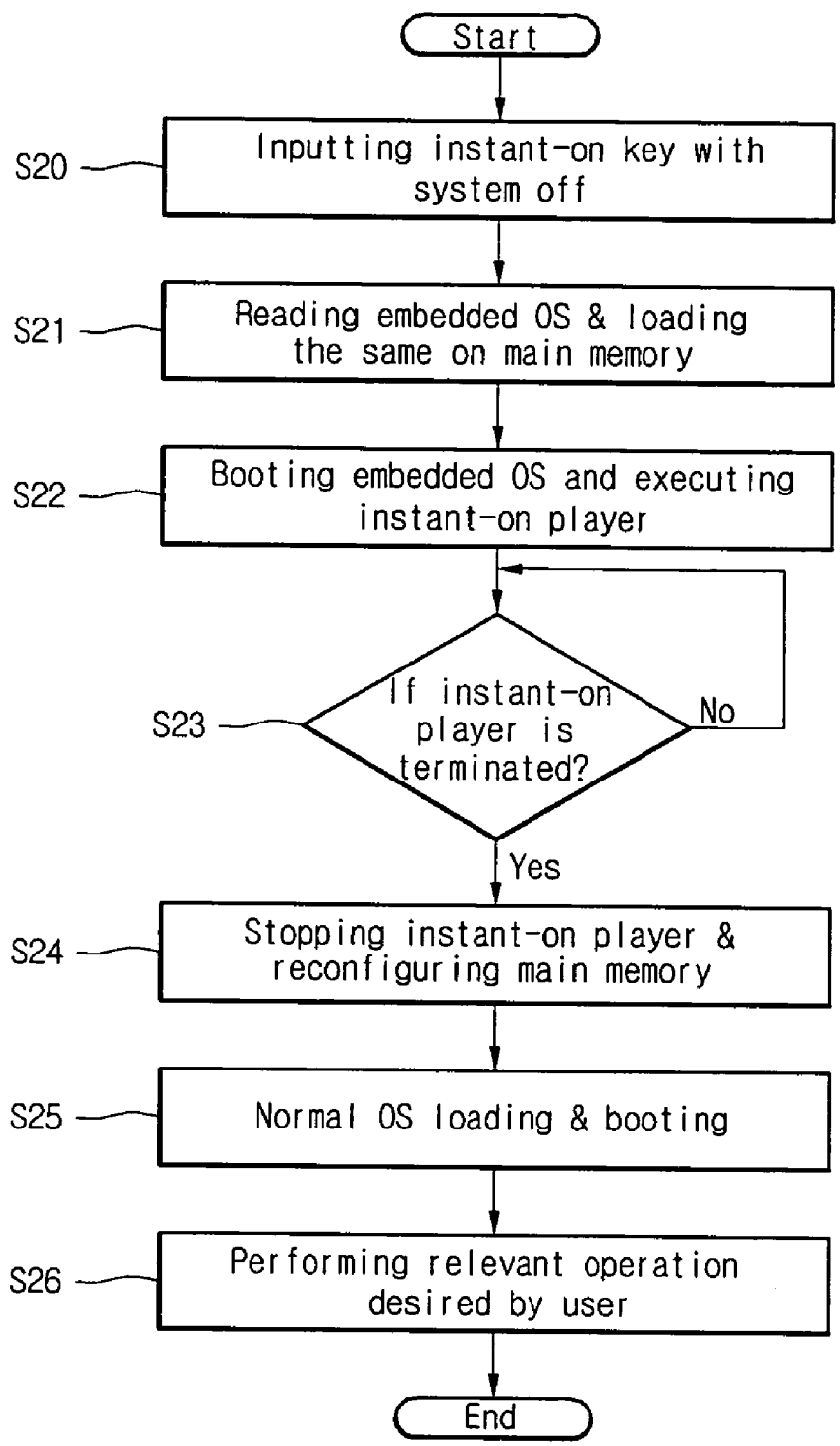
FIG. 5 is a flowchart showing a method for changing an OS in a computer system having a multi-OS according to a first preferred embodiment of the present invention.

FIG. 5 is a flowchart showing a method for changing the multi-OSs according to a first embodiment of the present invention. The embodiment of a method for changing multi-OSs will be described using and can be applied to the embodiment shown in FIG. 4. However, the invention is not intended to be so limited.

As shown in FIG. 5, with the computer system off, if a user selects the instant-on key (block S20), a power source can be supplied to the system. Also, the keyboard controller 27 can generate a key value in response to the instant-on key and output the same to the BIOS ROM 28.

In the meantime, the BIOS can perform the system initialization and the POST process. At this point, the main memory 23 can be divided into a plurality of areas (e.g., slot #1 and slot #3) on which the embedded OS and the normal OS can be respectively loaded as shown in FIG. 3, or divided into the upper memory area and the lower memory area (e.g., A area, B area) as shown in FIG. 4.

Also, the BIOS can select the embedded OS stored in a hidden area of the HDD 26 in accordance with the instant-on key. The boot loader 26*a* can read the embedded OS necessary for performing the selected IOF and load the same on the main memory 23 (block S21).

After the embedded OS loaded on the main memory 23 is booted, the IOP is executed (block S22) so that the IOF can be performed. The IOF can be playing the DVD or the MP3 audio or the like.

If the IOF is terminated according to a request from a user while the IOP operates (block S23), a resource of the Linux program and use of a memory can be returned so that the IOP is terminated. At this point, the CPU 20 can automatically reconfigure the main memory 23 even if the system is turned off and reset is not input (block S24).

At this point, the BIOS can select the normal OS stored in the HDD 26 and the boot loader 26*a* can operate to load the normal OS on a reserved area divided and/or assigned inside the main memory 23. After that, the loaded normal OS is booted so that the system booting operation can be automatically performed in a swift manner (block S25).

If the system is normally booted with the normal OS going through the above process, an application desired by a user can be executed under the normal OS. Thus, various relevant operations desired by a user can be performed (block S26).

As shown in FIG. 5, even if a user does not execute in person the system off and reset operation, the normal OS in the HDD can be read and efficiently loaded on a reserved area divided and assigned in advance in the main memory when the IOF is stopped. Then, the normal OS can be booted and executed in a swift manner.

Figure 6:
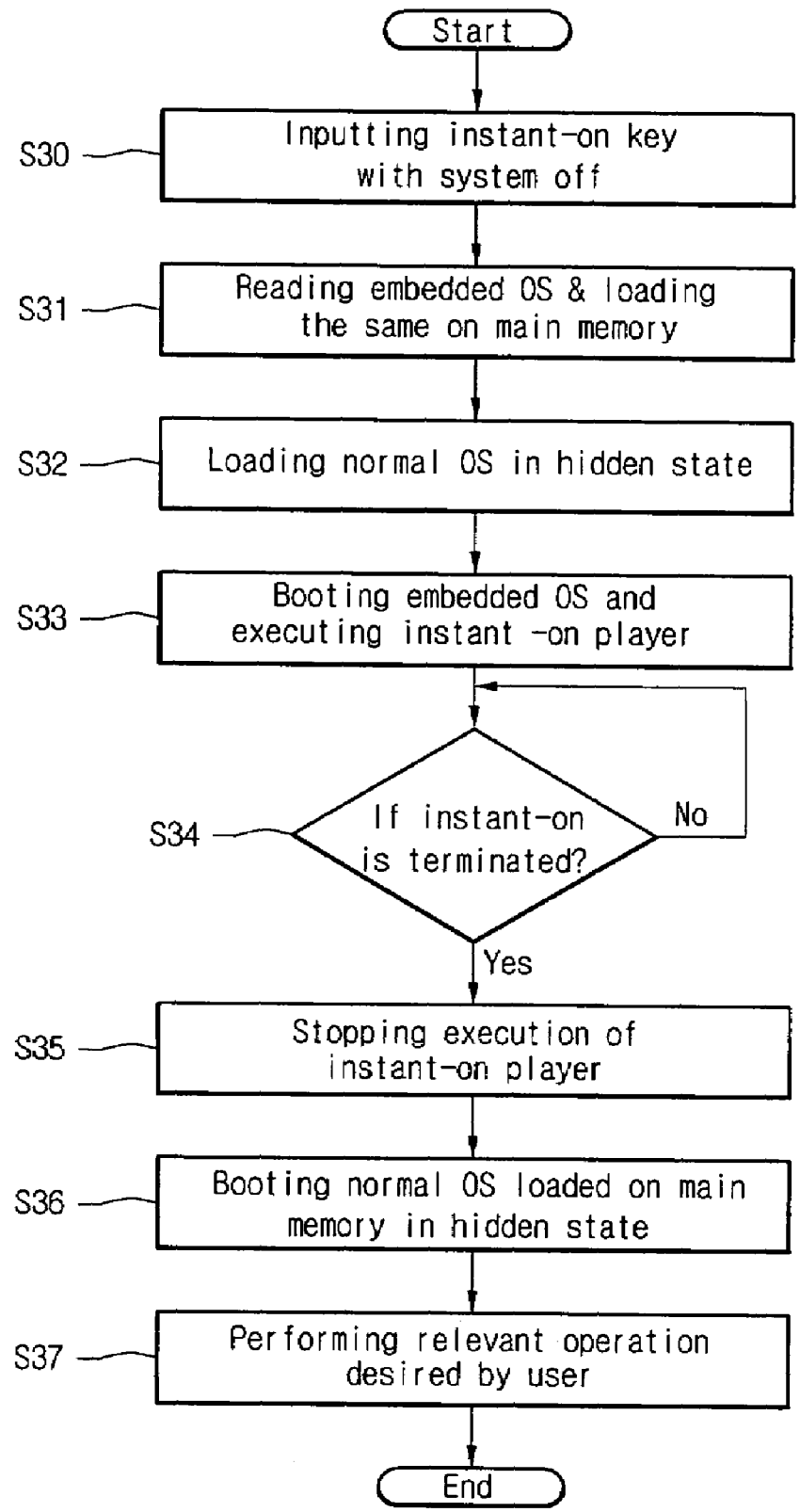
FIG. 6 is a flowchart showing a method for changing an OS in a computer system having a multi-OS according to a second preferred embodiment of the present invention.

FIG. 6 is a flowchart showing a method for changing multi-OSs according to a second embodiment of the present invention. The embodiment of a method for changing multi-OSs will be described using and can be applied to the embodiment shown in FIG. 4. However, the invention is not intended to be so limited.

As shown in FIG. 6, if a user selects and inputs an instant-on key using a key input part with a computer system off (block S30), a power source can be supplied to the computer system. Also, the keyboard controller 27 can generate a key value in response to the instant-on key and output the same to the BIOS ROM.

In the meantime, the BIOS of the BIOS ROM can execute the system initialization and the POST process and divide the main memory area. The specific initialization routine, which can be an initialization operation intended for the embedded OS, can use a reduced or a minimum hardware resource.

At this point, if the Linux program or the like necessary for performing the IOF is selected by the instant-on key, the boot loader 26*a* can read the embedded OS and upload the same on the main memory 23 from among a plurality of programs stored in the HDD 26 (block S31). At this point, the BIOS can load the normal OS, in a hidden state, on a reserved area 23*c* or a lower memory area 23*e* of the main memory 23 (block S32).

After the Linux program loaded on the main memory 23 is booted, the IOP can be executed (block S33) so that the IOF such as playing the DVD or the MP3 audio can be performed.

If the IOF is terminated according to a request (e.g., a hot key) from a user while the IOP executes (block S34), a resource of the Linux program and use of a memory can be returned so that the execution of the IOP is terminated (block S35). Simultaneously, a system booting operation for booting the normal OS loaded on the reserved area of the main memory, can be automatically performed (block S36).

If the system is normally booted going through the above process, the normal OS can be executed. Then, various relevant operations desired by a user are performed (block S37).

As shown in FIG. 6, even if a user does not execute in person the system off and reset operation, the normal OS uploaded (e.g., preferably in a hidden state) on the reserved area of the main memory can be swiftly booted and executed.

Figure 7:
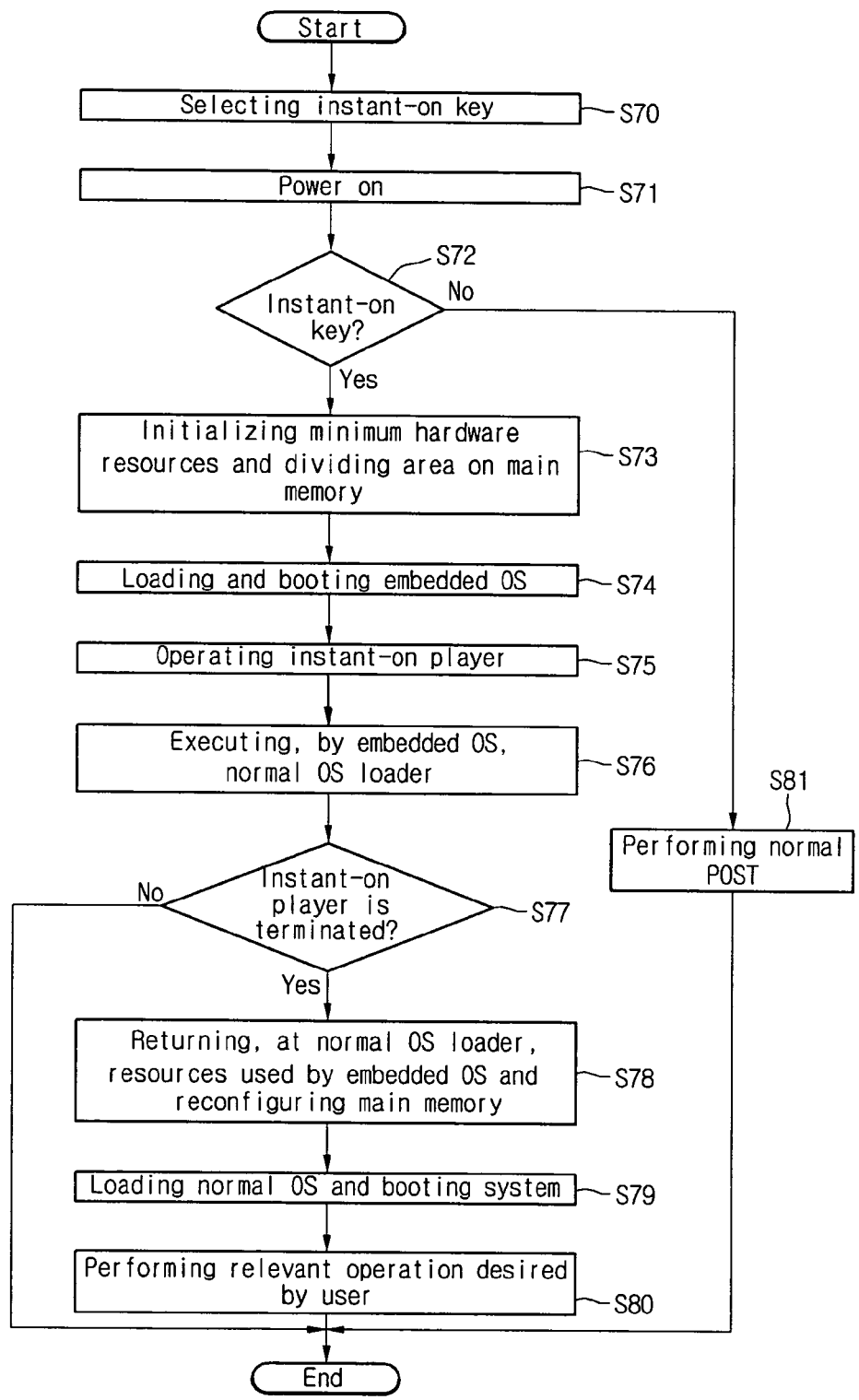
FIG. 7 is a flowchart showing a method for changing an OS in a computer system having a multi-OS according to a third preferred embodiment of the present invention.

FIG. 7 is a flowchart showing a method for changing multi-OSs according to a third embodiment of the present invention. The embodiment of a method for changing multi-OSs will be described using and can be applied to the embodiment shown in FIG. 4. However, the invention is not intended to be so limited.

As shown in FIG. 7, if a user selects an instant-on key for an IOF (e.g., playing a DVD) (block S70), a power source can be supplied to each part of the computer system so that a BIOS operates (block S71). The BIOS can check whether it is a booting by the instant-on key (block S72). If it is checked to be the booting by the instant-on key, a specific initialization routine is performed, but if it is not the booting by the instant-on key as a result of the checking, the normal POST process can be performed (block S81).

The specific initialization routine, which can be an initialization operation intended for the embedded OS, can use a reduced or a minimum hardware resource on the First place and can divide the main memory into a predetermined number of areas (block S73). Here, the reason why the main memory is preferably divided into multi-areas simultaneously is that a process or trick of the system can be used to make (or make use of) two areas since the OS can know the system's memory size by execution of a BIOS function.

At this point, if the embedded OS stored in a hidden area of the hard disk is loaded on the embedded area of the main memory, the embedded OS can be booted and a system control can be turned over to the embedded OS (block S74). After that, the embedded OS can operate the IOP that corresponds to the instant-on key (block S75).

At this point, the embedded OS can execute the normal OS loader (e.g., a boot loader) to load the normal OS (block S76). Further, whether the IOP is terminated can be checked (block S77).

If the IOP is terminated as a result of the checking, the normal OS loader can return the resource used by the embedded OS and reconfigure the main memory (block S78). Checking whether the IOF is terminated can include a case where the IOP is terminated and a case of termination of the IOF.

Here, reconfiguration of the main memory can be performed in such a way that since memory area has been divided when the IOF was initially performed, the resources used for loading the OS are all returned and the divided memory area is restored back to the original configuration. For example, a BIOS memory size function can play a role of returning an original memory size. Further, for example, resources returned to the OS can include related hardware such as an OS driver, chip set register and a memory area needed to recover the OS.

After that, the normal OS can be loaded on the normal OS area of the main memory, and the system can be booted (block S79). After that, a relevant operation desired by a user can be performed under the normal OS (block S80).

Figure 8:
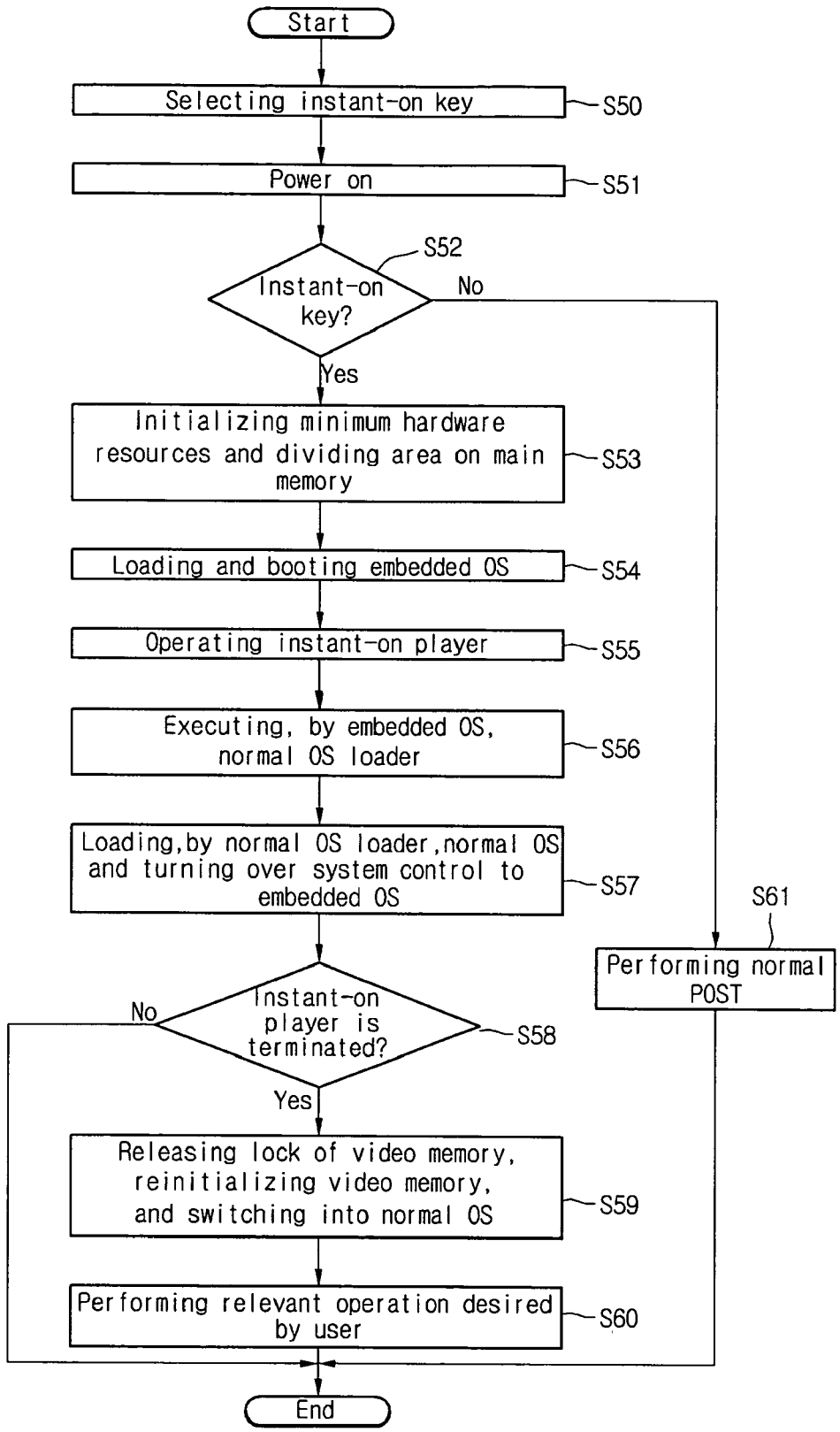
FIG. 8 is a flowchart showing a method for changing an OS in a computer system having a multi-OS according to a fourth preferred embodiment of the present invention.

FIG. 8 is a flowchart showing a method for changing multi-OSs according to a fourth embodiment of the present invention. The embodiment of a method for changing multi-OSs will be described using and can be applied to the embodiment shown in FIG. 4. However, the invention is not intended to be so limited.

As shown in FIG. 8, a user can select an instant-on key to use an IOF in a computer system (block S50). Then, a power source can be supplied to the computer system (block S51) and a BIOS operates.

The BIOS can determine whether it is a booting by an instant-on key (block S52). If it is the booting by the instant-on key as a result of the checking (block S52), a routine for an embedded OS environment can be executed. If it is not the booting by the instant-on key as a result of the checking (block S52), a normal POST process can be performed (block S61).

For that purpose, in case of the booting by the instant-on key, the BIOS can perform an initialization of a reduced or minimum hardware resource and divide the area on the main memory (block S53). Also, the embedded OS can be loaded from the HDD and the booting can be performed with the embedded OS (block S54). If the booting is completed with the embedded OS, an IOP that corresponds to the instant-on key can be operated under the embedded OS (block S55), so that playing a DVD, an audio or the like can be performed.

The embedded OS can execute a normal OS loader (block S56). If the IOP is operated, a CPU can become an idle state in a viewpoint of a hardware. At this point, if the embedded OS executes the normal OS loader, the normal OS loader can store a context of the current embedded OS in the HDD, and load the normal OS stored in the HDD on the main memory area. The context at this point can also be stored in the HDD and a system control is turned over again to the embedded OS by the normal OS loader (block S57). At this point, after the stored context is stored again, a normal operation can be performed.

Here, the context can mean, for example, internal register information of the CPU or a flag status and register status of various system resources (e.g., CPU register, chipset register, various PCI device registers or the like). Since the OS uses the above resources, the booting is performed in a hidden state, and the current information context used by the embedded OS conflicts with the context of the normal OS, so that the context of the normal OS is stored. Such context information is stored in a hidden area of the HDD.

Also, the context is stored in the HDD for OS switching by a hot key, and if the OS is changed, the context of the OS previously used can be restored. A variety of CPU, chipset, PCI device information is preferably recorded on the context.

Afterwards, if termination of an IOP is selected after use of the IOF, i.e., if a user presses a hot key to terminate the IOF (block S58), a hot key handler turns over a system control to the normal OS, and the stored context is restored by the normal OS and switching into an operation status of the normal OS, is performed (block S59).

For example, the hot key handler can release a video memory lock and reinitialize the video to switch into the normal OS (block S59). Accordingly, a very rapid change (e.g., nearly instant change) to the normal OS can be achieved. Afterwards, a relevant operation desired by a user is performed under the normal OS (block S60).

According to embodiments of the invention, when a user terminates the executing IOF/IOP, preferably the user will not recognize that the normal OS is booting or loading. Preferably, selected system data generated by the embedded OS can be used when starting the normal OS to reduce booting time of the normal OS. Preferably initialization messages will not be displayed on the screen to the user. Further, a time for system booting can be reduced to an extent that preferably, the user can begin to execute normal operations directly after terminating the IOF/IOP. In other words, the normal OS will appear to be loaded and booted while operating the IOF/IOP.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments according to the invention have various advantages. For example, using embodiments of the invention, it is possible to forcibly or automatically boot a normal OS in case an IOP is stopped or terminated after an embedded OS is booted for the IOF and the IOP operates. According to embodiments of a computer system having multi-OSs and methods for changing an OS of multi-OSs, in case the IOF is stopped under the embedded OS supporting the IOF, the normal OS can be loaded on the divided and assigned area in the main memory, whereby an automatic task switching from the embedded OS to the normal OS can be performed even if a user does not execute in person the system off and reset operation.

Also, according to embodiments of the invention, a normal OS can be loaded in a hidden state, on the assigned area in the main memory while the IOP operates at the moment that the embedded OS is booted, and an automatic task switching into the normal OS simultaneously with stopping of the IOF can be performed. Accordingly, an inconvenience due to manual operation by a user can be resolved or a time consumed for booting operation of the system by the normal OS can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A computer system having a multi-operating system (OS), comprising:
    a central processing unit (CPU);
    an input part configured to control an instant-on function (IOF) by a user;
    a main memory divided into a first area that stores an embedded OS (EOS) for execution of the IOF and a second area that stores a normal OS (NOS) for normal system operation;
    a hard disk drive (HDD) that stores the normal OS, the embedded OS, and a boot loader capable of loading said OS to the main memory; and
    a normal OS loader that controls the loading of the normal OS and switches from the EOS to the NOS without turning off the CPU, wherein the IOF to perform a function by executing the embedded OS prior to the computer system booting or executing the normal OS for normal system operation, wherein the normal OS loader controls the loading of the normal OS and switches to the normal OS under the embedded OS when the IOF is selected.

2. The computer system according to claim 1, wherein the main memory concurrently stores the EOS in the first area and the NOS in the second area.

3. The computer system according to claim 2, wherein the HDD stores a plurality of OSs in addition to the NOS and the EOS, and wherein the main memory concurrently stores the EOS in the first area and the NOS in the second area when the EOS is operating.

4. The computer system according to claim 2, wherein the normal OS loader controls booting of the loaded normal OS when the IOF is terminated.

5. The computer system according to claim 1, wherein the normal OS loader returns resources used by the embedded OS, loads the normal OS in the second area of the main memory, and performs a booting of the normal OS when an instant-on player (IOP) is stopped.

6. The computer system according to claim 1, wherein the normal OS loader turns over a system control to the embedded OS after loading the normal OS in the second area of the main memory.

7. The computer system according to claim 1, wherein the second area is a reserved area.

8. The computer system according to claim 1, wherein the normal OS loader is configured to control the loading of the normal OS onto the main memory only after an instant on function by the embedded OS is performed and switch from the EOS to the NOS without turning off the CPU.

9. The computer system according to claim 1, wherein the function comprises playing a DVD player.

10. The computer system according to claim 1, wherein the function comprises playing a MP3 audio file.

11. A method for changing an operating system (OS) in a computer system having multi-OSs, the method comprising:
    supplying a power source to the computer system and loading an embedded OS stored in a hard disk on a main memory when an instant-on-function (IOF) is enabled, wherein supplying the power source and loading the embedded OS includes reading a normal OS stored in a hard disk drive (HDD) and automatically loading the normal OS in a prescribed region of a divided reserved area in the main memory;
    booting the embedded OS loaded on the main memory and operating an instant-on player (IOP) using the embedded OS to perform the enabled IOF, wherein operating the IOP occurs prior to the computer system booting the normal OS; and
    automatically loading the normal OS stored in the hard disk on the main memory when the IOF is terminated without a reinitialization operation.

12. The method according to claim 11, further comprising performing an arbitrary operation requested by the user after booting the normal OS loaded on the main memory.

13. The method according to claim 11, wherein supplying the power source and loading the embedded OS further includes initializing a hardware determined in advance for the embedded OS and dividing an area on the main memory.

14. The method according to claim 13, wherein the area on the main memory is a reserved area divided into at least two areas and the embedded OS is loaded in a first area and the normal OS is loaded on a second area, and wherein said initializing and dividing is performed by a basic input/output system (BIOS).

15. The method according to claim 11, wherein the normal OS is loaded in the main memory by the embedded OS or a normal OS loader.

16. The method according to claim 15, wherein the embedded OS executes the normal OS loader during operation or upon termination of the IOP so that the normal OS loader performs a loading operation of the normal OS due to stopping of the IOP.

17. The method according to claim 15, further comprising:
after executing, by the embedded OS, the normal OS loader and loading, by the normal OS loader, the normal OS in a second area of the main memory, turning over a system control to the embedded OS; and
reinitializing a video memory and switching to the normal OS when the IOF is terminated.

18. The method according to claim 11, wherein the normal OS comprises a Windows OS.

19. A method for changing an operating system (OS) in a computer system having multi-OSs, the method comprising:
supplying a power source to the system when an instant-on-function is enabled with the computer system off;
loading an embedded OS and a normal OS in different areas of a main memory, respectively;
operating an instant-on player (IOP) requested by a user by booting and executing the loaded embedded OS prior to booting and executing the normal OS, wherein operating the IOP comprises one of playing a DVD or playing an audio file;
booting and executing the normal OS loaded in the main memory when the IOP is terminated without a reinitialization operation; and
performing an arbitrary operation requested by a user using the normal OS.

20. The method according to claim 19, wherein loading an embedded OS and a normal OS comprises after reading the embedded OS, stored in a hidden state on a HDD, and loading the same in a first area of the main memory, loading the normal OS stored in the HDD in a second area, which is a reserved area of the main memory, in a bidden state.

21. The method according to claim 19, wherein the normal OS is loaded in advance in a hidden state on a reserved area of the main memory.

22. A method for changing an operating system (OS) in a computer system having multi-OSs, the method comprising:
supplying a power source to the system when an instant-on signal is input corresponding to an instant-on function (IOF);
initializing a reduced hardware configuration and dividing an area in a main memory when a system booting corresponds to the instant-on signal;
turning over a system control to an embedded OS corresponding to the IOF after loading the embedded OS in a prescribed area of the divided main memory;
performing booting and operating of an instant-on player (IOP) using the embedded OS; and
in response to the IOP being subsequently terminated, automatically performing booting of a normal OS after returning resources used by the embedded OS, reconfiguring the main memory, and loading the normal OS on the main memory, wherein a normal OS loader controls loading of the normal OS and switches to the normal OS under the embedded OS when the IOF is selected.

23. The method according to claim 22, wherein the embedded OS executes a normal OS loader during operation or upon termination of the IOP so that the normal OS loader performs a loading operation of the normal OS due to stopping of the IOP.

24. The method according to claim 22, wherein operating the IOP comprises one of playing a DVD or playing an audio file.

25. A method for changing an operating system (OS) in a computer system having multi-OSs, the method comprising:
supplying a power source to the system responsive to an instant-on-function (IOF) signal;
initializing a subset of computer system hardware and dividing an area in a main memory when a booting is determined to be caused by the IOF signal;
loading an embedded OS in a first area of the divided main memory and performing an IOF corresponding to the IOF signal under the embedded OS, wherein performing the IOF occurs prior to the computer system booting a normal OS;
after executing, by the embedded OS, a normal OS loader and loading, by the normal OS loader, the normal OS in a second area of the main memory, turning over a system control to the embedded OS; and
reinitializing a video memory and performing a task switching into the normal OS when the IOF is terminated, wherein reinitializing the video memory and performing the task switching includes releasing a lock of the video memory when the IOF is terminated.

26. The method according to claim 25, wherein after executing the normal OS loader and loading the normal OS in a second area of the main memory, turning over the system control to the embedded OS comprises:
storing a first context in a hard disk drive (HDD) by the embedded OS;
after locking a video memory, loading the normal OS in the second area of the main memory;
after the normal OS is loaded, storing a second context in the HDD and turning over a system control to the embedded OS; and
after restoring the first context generated in the storing, operating as the normal embedded OS.

27. The method according to claim 26, wherein after executing the normal OS loader and loading the normal OS in a second area of the main memory, turning over the system control to the embedded OS comprises executing the normal OS loader if the embedded OS is executed.

28. The method according to claim 25, wherein performing the IOF comprises booting and operating an instant-on-player, and wherein the IOF is terminated by a user.

29. The method according to claim 25, wherein the subset of computer system hardware is a video controller and corresponding power components or minimum hardware related to the IOF.

* * * * *